Dec. 25, 1951
L. GENETY
2,579,920
HYDRAULIC CHANGE-SPEED GEAR
Filed Nov. 19, 1946
3 Sheets-Sheet 1
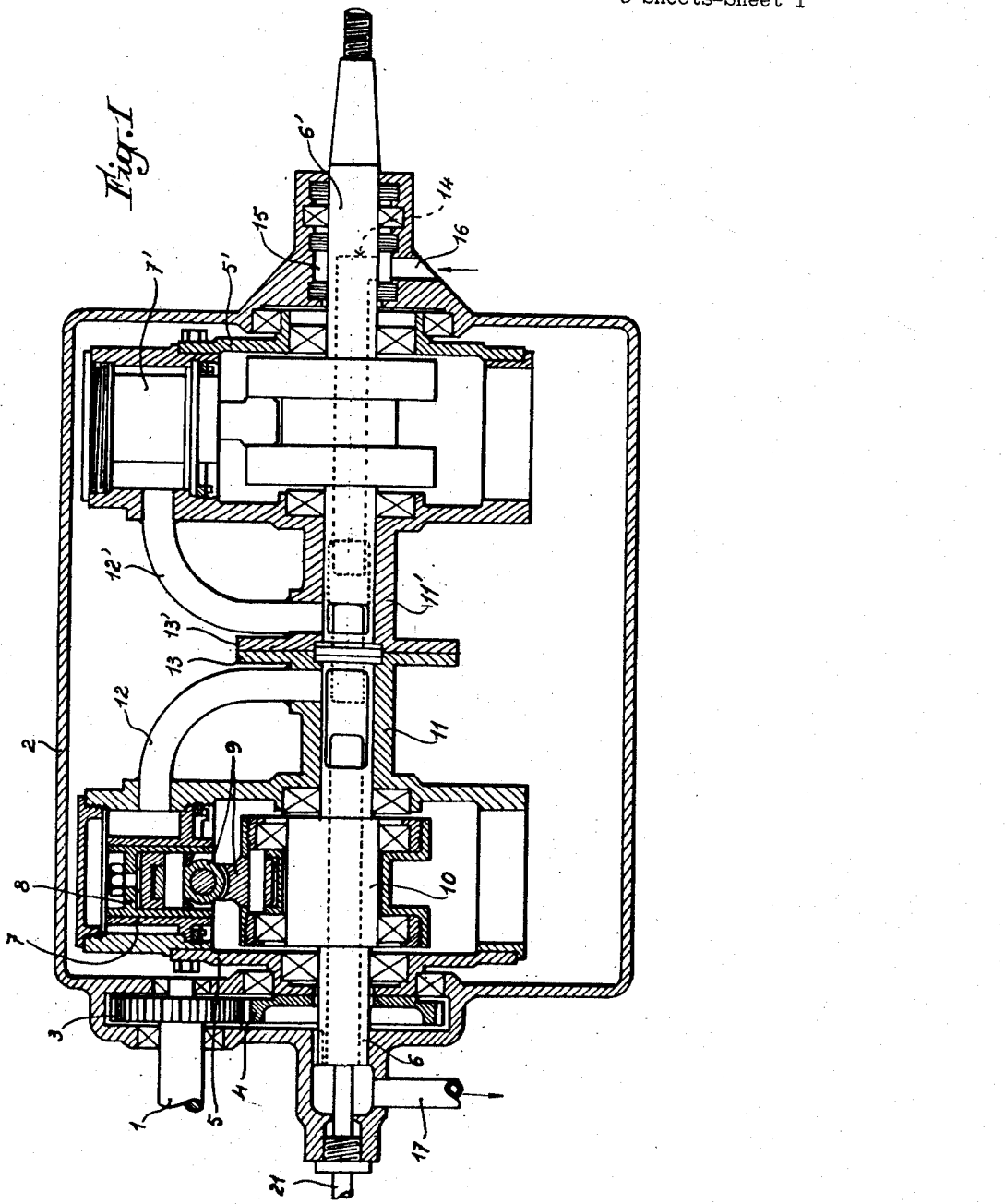

Dec. 25, 1951          L. GENETY          2,579,920
HYDRAULIC CHANGE-SPEED GEAR
Filed Nov. 19, 1946          3 Sheets-Sheet 2
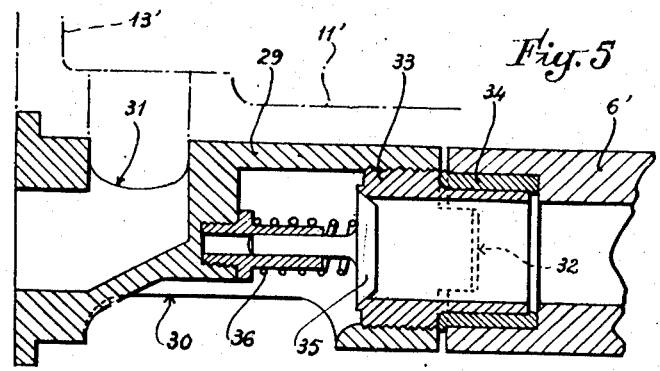
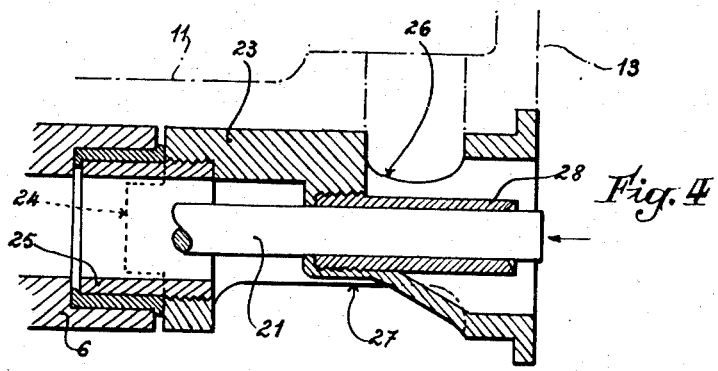
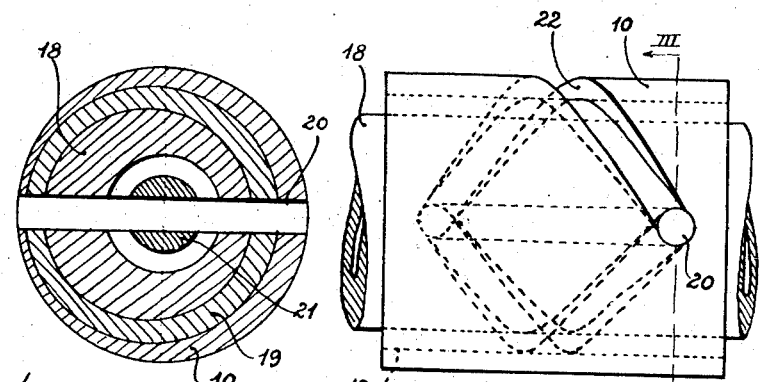
INVENTOR:-
Louis Genety
By Alexander Nowell
ATTORNEYS Dec. 25, 1951 L. GENETY 2,579,920
HYDRAULIC CHANGE-SPEED GEAR
Filed Nov. 19, 1946 3 Sheets-Sheet 3
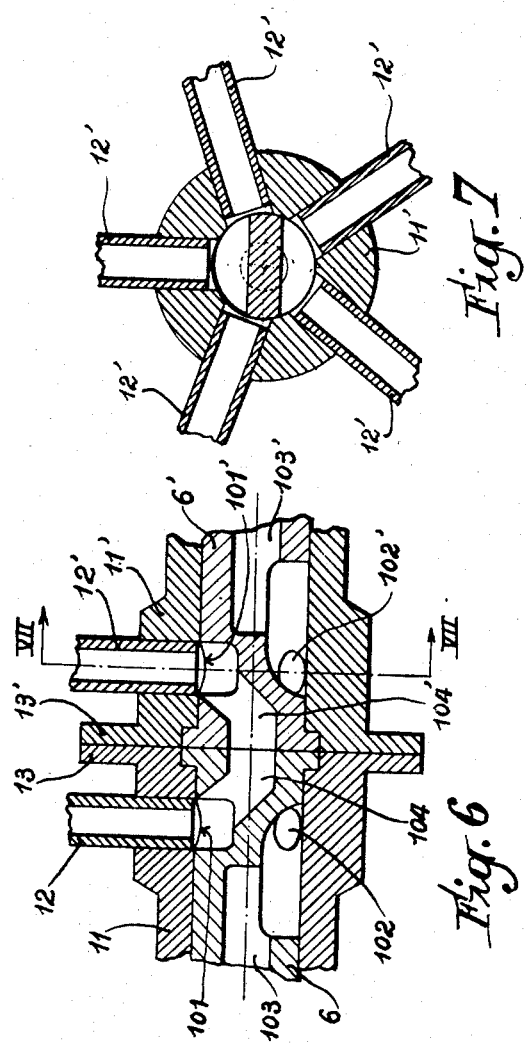
INVENTOR.
Louis Genety
BY
ATTORNEYS Patented Dec. 25, 1951

2,579,920

UNITED STATES PATENT OFFICE 2,579,920

HYDRAULIC CHANGE-SPEED GEAR

Louis Genéty, Lyon, France

Application November 19, 1946, Serial No. 710,885
In France December 10, 1945

2 Claims. (Cl. 60—53)

My invention relates to a progressive change-speed gear of the kind wherein the driving and the driven shafts are connected with each other by means of a device adapted to permit a variable amount of slip between the two shafts, while the energy corresponding to this slip is recuperated in an auxiliary motor the torque of which is added to the torque derived from the driving shaft.

A first object of my invention is a change-speed gear of the character above referred to, wherein the auxiliary motor acts on the driving shaft itself.

A further object of my invention is a change-speed gear wherein the mechanism interposed between the driving shaft and the driven shaft is a hydraulic pump, the body of which rotates with the driving shaft, while the crank or like part is coupled to the driven shaft, the auxiliary motor being a rotary hydraulic motor mounted on the driving shaft and cooperating with a fixed crank or like part, of variable eccentricity.

Still a further object of my invention is a change-speed gear of the above description, wherein the variation of eccentricity is effected automatically as a function of the discharge pressure of the pump.

My invention has also for its object a device for variable eccentricity comprising an eccentric on which there are mounted two superposed rotatable eccentric rings, the said rings being controlled in opposed directions by a transverse gudgeon pin driven through a straight longitudinal slot in the eccentric proper, and through two helicoidal slots of opposed pitch in the eccentric rings, in such a manner that a longitudinal displacement of the gudgeon pin causes the two rings to rotate through the same angle, but in opposed directions. The eccentricity of each ring being, for instance, one half of the eccentricity of the eccentric proper, it will be understood that it is thus possible to vary the eccentricity of the external surface of the outer ring between zero and twice the eccentricity of the eccentric proper.

Still a further object of my invention is a change-speed gear of the above character, wherein there is provided on the suction side of the pump a non-return valve to prevent the pump from drawing fluid from the motor when the direction of the torque is reversed. The pump is then blocked and acts as a solid coupling between the two shafts as soon as the torque becomes reversed.

In hydraulic transmissions embodying an hydraulic pump and an hydraulic motor the connections for oil circulation have hitherto been effected by means of passages forming a closed circuit within the gear itself. The oil has thus no practical possibility to cool down and the slightest leak in the high-pressure part causes a vacuum in the low pressure part. Also the oil circuit, which necessitates two conduits or passages, is difficult to establish between parts in relative rotation.

In my improved gear this drawback is avoided by only providing one oil passage between the pump and the motor, the latter discharging into an open tank from which oil is sucked by the pump. The construction is thus simplified, the oil may cool down and settle, any air or gas present in the oil may freely escape, and if there is a leak in the high pressure part of the gear it may be continuously returned to the open tank without causing any reduction in the operative mass of oil.

In the annexed drawings:

Fig. 1 is a general longitudinal section through a change-speed gear made in accordance with my invention.

Fig. 2 is an enlarged side view of the mechanism ensuring variable eccentricity.

Fig. 3 is a cross-section through line III—III of Fig. 2.

Fig. 4 is a large scale longitudinal section through the device for automatic control of the eccentricity.

Fig. 5 is a large scale section through the non-return valve.

Fig. 6 is a large scale partial longitudinal section illustrating the central distributors in the gear of Fig. 1.

Fig. 7 is a cross-section taken along line VII—VII of Fig. 6.

The change-speed gear illustrated in Fig. 1 comprises an inlet shaft 1 carried by a fixed outer casing 2. Shaft 1 drives through gears 3 and 4 a rotatable casing 5 supported by a fixed shaft 6 keyed to the outer casing 2. Casing 5 carries a number of radial cylinders 7 housing pistons 8 attached to connecting rods 9 cooperating with an eccentric 10 on shaft 6. The construction of this eccentric 10 will be described later. Connecting rods 9 are very short and they are formed in two parts hinged together about an axis at right angles to the axis of eccentric 10, this arrangement being adapted to permit perfect adjustment of the parts in spite of the unavoidable defects in the centering of the cylinders.

The common connection of connecting rods 9 on eccentric 10 may be obtained by any appropriate means, particularly by the known arrangement comprising a master connecting rod directly articulated on the eccentric and to which the other connecting rods are in turn articulated.

The rotating casing 5 extends on shaft 6, opposite to gear 4 in the form of a sleeve 11 which fits tightly on shaft 6. Cylinders 7 are connected with sleeve 11 by pipes 12 leading to a distributor formed by ports in sleeve 11 corresponding to the successive pipes 12, and by two opposed openings 101 and 102 cut in shaft 6. Opening 102 is an outlet port and is connected with an outlet canal 103 leading to the left-hand end of shaft 6 and is for discharge of liquid from the cylinders; the other opening 101 is an inlet port and is used for admission of liquid to the said cylinders, and leads to an inlet canal 104 opening at the right-hand end of shaft 6, as clearly shown in Figs. 6 and 7.

Sleeve 11 terminates into a flange 13 which is bolted to a flange 13' forming part of an arrangement similar to that just described, but disposed symmetrically with respect to the latter. This second arrangement comprises a sleeve 11', a rotating casing 5' solid with the aforesaid sleeve, radial cylinders 7' mounted in this casing with a corresponding system of pistons and connecting rods cooperating with an eccentric on a shaft 6' on which the casing 5' is loose. Shaft 6' also forms in combination with sleeve 11' a distributor formed by ports in sleeve 11' corresponding with the successive pipes 12' and by two opposed openings 101' and 102' cut in shaft 6'. Opening 102' is a suction port and is connected with a suction canal 103' leading to the right-hand end of shaft 6' for the admission of liquid to the pump cylinders. The other opening 101' is an outlet port and is used for discharge of liquid from the cylinders and leads to an outlet canal 104' opening at the left-hand end of shaft 6'. The distributor 101', 102', 103', 104' is connected with cylinders 7' by pipes 12' (Figs. 6 and 7), but while the above-described shaft 6 is fixed, shaft 6' is adapted to rotate within casing 2 from which it projects for transmission of movement. Another difference between the two systems is that the eccentric on shaft 6' has a fixed eccentricity, while the eccentricity of eccentric 10 is variable, as explained below.

The discharge of liquid from distributor 6'—11' takes place to the left in the restricted space separating the ends of shafts 6 and 6', while the admission is effected through a radial aperture 14 opening in an annular water-tight chamber 15 formed in casing 2 by means of appropriate packings. A channel 16 connects chamber 15 with liquid pipes not illustrated, leading to a liquid tank not shown.

The operation of the mechanism described is as follows:

When shaft 1 rotates in the appropriate direction, it causes rotation of the block formed of casings 5 and 5' with sleeves 11 and 11', and flanges 13 and 13'. This block plays the role of the driving shaft in the change-speed gear proper. It rotates on the fixed shaft 6 and on the movable shaft 6', the latter playing the role of the driven shaft. It is moreover carried by two bearings forming part of casing 2.

Owing to the reaction of the machine or like apparatus driven by shaft 6', there is a tendency for the latter to remain fixed, or at least to rotate less rapidly than shaft 6. The hydraulic system formed of cylinders 7' with their corresponding pistons and connecting rods therefore operates as a pump and liquid (which will be hereafter supposed to be oil) will be drawn in by channel 16 and chamber 15, and it will be discharged under pressure towards shaft 6 and system 7—8—9—10 which will operate as a motor, the oil leaving finally by the left-hand end of shaft 6 through the outlet pipe 17, whence it is returned to the oil tank.

It will be evident that pump 7' cannot discharge more oil than motor 7 allows to pass. For a given rotational speed of the driving shaft (block 5—5') and for a given eccentricity of eccentric 10, the output of motor 7 is exactly determined and therefore the slip of shaft 6' with respect to the driving shaft 5—5' is also exactly determined. The transmission ratio thus finally depends upon the eccentricity of eccentric 10.

For zero eccentricity, there is no slip and the drive is direct. Pump 7' acts as a rigid coupling. For any given transmission ratio, the energy corresponding to the slip between the driving shaft 5—5' and the driven shaft 6' is, except for unavoidable losses, wholly recuperated by motor 7 in the form of an additional torque applied to the driving shaft.

Figs. 2 and 3 illustrate the arrangement adapted to ensure variable eccentricity. There is provided on the shaft (shaft 6 of Fig. 1) an eccentric portion 18 which may be supposed to possess an eccentricity equal to one half the maximum eccentricity desired. And on this eccentric portion 18 there are mounted two eccentric rings 19 and 19 having an eccentricity equal to one half the eccentricity of portion 18 (i. e. one fourth of the maximum eccentricity desired).

Portion 18 is hollow and its wall has two longitudinal apertures cut at opposite ends of the diameter which forms the axis of symmetry of the said portion, such apertures accommodating a transverse pin 20 driven through an axial control rod 21. Pin 20 also passes through helicoidal grooves cut in the walls of rings 19 and 10, these grooves having equal and opposed pitches. One of these grooves is referenced 22 in Fig. 2. Pin 20 has a length exactly equal to the outer diameter of ring 10 and it is held in position by the bearing (not illustrated) of the master connecting rod corresponding to the set of cylinders 7. Its axis is of course directed along the line of eccentricity of portion 18 (axis of symmetry of the cross-section of this portion).

It will be clear that when rod 21 is displaced axially, rings 19 and 10 are caused to rotate through the same angle, but in opposed direction. When the eccentricity of both rings is in opposed direction with respect to the eccentricity of portion 18 (position illustrated in Fig. 3), the resultant eccentricity of the outer surface of ring 10 is zero. When both rings will have been rotated through 180° in opposed direction, their eccentricity will be in the same direction as the eccentricity of portion 18 and the resultant eccentricity of the outer surface of ring 19 will become equal to twice the eccentricity of the said portion.

It will be observed that during rotation of the rings pin 20 remains directed along a diameter of the outer surface of the outer ring 10 and along a diameter of the inner surface of the inner ring 19. It follows that the cutting of the helicoidal grooves in the rings is easily performed, for instance by means of an end-milling cutter directed along these diameters.

It will also be seen that the eccentricity of each individual part 18, 19 or 10 is small enough to prevent axial displacement of rod 21 under the reaction of the connecting rods on the rings.

Pin 20 must of course be able to slide freely through rod 21.

In Fig. 1, the control rod 21 is illustrated as projecting externally for connection with any appropriate actuating means. But it is of advantage to provide an automatic control by means of a pressure-responsive device submitted to the discharge pressure of the pump, which is a function of the torque transmitted.

Fig. 4 illustrates an appropriate arrangement. There is arranged on the right-hand end of shaft 6 an extension 23 adjusted by means of a lateral tenon 24 and centered by means of a reducing socket 25 screwed into the extension 23. The said extension comprises distributing apertures 26 and 27 for pipes 12, separated by a partition carrying a sleeve 28 through which rod 21 is passed. Rod 21 is loaded by means of a spring (not illustrated) acting on its left-hand end to return the said rod towards the right, which position will be supposed to correspond to minimum eccentricity (for instance zero eccentricity).

Rod 21 forms a pressure responsive piston submitted to the pressure of the discharge side of the pump (arrow of Fig. 4). As long as the action of this pressure is lower than the reaction of the spring, the control rod does not move, and the gearing remains set for maximum transmission ratio (in practice direct drive). But as soon as this limiting pressure is exceeded due to increase of the resisting torque, rod 21 moves towards the left, causing a progressive increase of the eccentricity of eccentric 10. Slip begins to take place between the driving shaft and the driven shaft and the transmission ratio becomes smaller than 1 to 1. This ratio decreases as the torque increases. It is thus possible to have this ratio constantly adapted to the load, for instance in the case of an internal-combustion engine driving the wheels of a vehicle.

The invention thus permits, amongst other applications, to provide an automatic change-speed gear for road or rail vehicles, wherein the oil does not work under normal direct drive conditions, which is a considerable advantage over most hydraulic transmissions. The wear and power losses involved by the hydraulic operation only take place when starting, maneuvering or ascending steep hills.

The initial load and elastic reaction of the spring acting on rod 21 determine the law according to which the transmission ratio is adjusted in proportion to the resisting torque. These conditions might even be under the control of the driver who may, for instance, vary the initial compression of the spring.

When the transmission of power is reversed, for instance when a vehicle drives its engine, shaft 6' tends to rotate faster than block 5—5'. Pump 7' is reversed, its suction taking place at the left-hand end of shaft 6' (Fig. 1) while the discharge is effected at the right-hand end of same. Since canals 16 and 17 are not connected with each other under water-tight conditions (they communicate with an open oil tank), the discharge of the pump is quite free and the pump tends to race, causing a vacuum in the discharge from motor 7, whatever may be the adjustment of the latter. This drawback may be avoided by inserting a non-return valve in the normal inlet of the pump to avoid reversal of the same.

Fig. 5 shows such a non-return valve. An extension 29 has been added at the left-hand end of shaft 6', such extension carrying the distributing apertures 30 and 31 co-acting with pipes 12'. A tenon 32 connects this extension with the shaft and a reducing socket 33 with joint 34 is provided to ensure centering and water-tightness. The reducing socket 33 forms a seat for the non-return valve 35 loaded by a spring 36. In normal operation valve 35 is raised by the flow of oil sucked by the pump, but if the transmission of power is reversed, the oil flow is also reversed and it closes valve 35, thus blocking the pump which forms a rigid coupling between shaft 6' and block 5—5'. If at the same time the eccentricity of eccentric 10 is at zero motor 7 is inoperative and the whole mechanism operates as a rigid coupling between the driving load and the driven engine.

It will be observed that with the automatic control illustrated in Fig. 4, the return to zero eccentricity of eccentric 10 is automatically ensured when the transmission of power is reversed. Any intervention of the driver is therefore unnecessary.

I claim:

1. A hydraulic change-speed gear comprising a hollow driving shaft adapted to receive power to be transmitted; a set of hydraulic pump cylinders at one end of said driving shaft; a set of hydraulic motor cylinders at the other end of said driving shaft; a rotatable driven crankshaft to cooperate with said pump cylinders, said crankshaft being in line with said driving shaft and having one of its ends engaged thereinto; pistons in said pump cylinders; means to connect said pistons with said crankshaft; distributing means for said pump cylinders including a suction port and an outlet port at the inner end of said crankshaft, an outlet canal in said crankshaft communicating with said outlet port and opening in the end of said crankshaft engaged into said hollow driving shaft, and a suction canal in said crankshaft communicating with said suction port and extending towards the opposite end of said crankshaft, means exterior to said crankshaft to connect said suction canal with a fixed suction line exterior to said crankshaft; a fixed crankshaft to cooperate with said motor cylinders, said fixed crankshaft being in line with said hollow driving shaft and having one of its ends engaged thereinto; pistons in said motor cylinders; means to operate said last-named pistons by said fixed crankshaft; distributing means for said motor cylinders including an inlet port and an outlet port at the inner end of said fixed crankshaft, an inlet canal in said fixed crankshaft communicating with said last-named inlet port and opening in the end of said fixed crankshaft engaged into said hollow driving shaft, and an outlet canal in said fixed crankshaft communicating with said last-named outlet port and extending towards the opposite end of said fixed crankshaft; means to connect said last-named outlet canal with a discharge line exterior to said fixed crankshaft; and means exterior to said driving shaft to vary the eccentricity of said fixed crankshaft.

2. In a hydraulic change speed gear as claimed in claim 1, non-return means in said suction canal between said suction port and said means connecting said suction canal to a suction line, to prevent reversal of operation of said pump cylinders.

LOUIS GENÉTY.

REFERENCES CITED

The following references are of record in the file of this patent:

UNITED STATES PATENTS

| Number | Name | Date |
|---|---|---|
| 1,107,675 | Lentz | Aug. 18, 1914 |
| 2,141,166 | Bischof | Dec. 27, 1938 |
| 2,227,631 | Carter | Jan. 7, 1941 |